(12) United States Patent
Wang

(10) Patent No.: US 8,985,172 B2
(45) Date of Patent: Mar. 24, 2015

(54) LIQUID CRYSTAL SEALANT FORMING DEVICE AND DISPLAY PANEL ASSEMBLY APPARATUS USING THE SAME

(75) Inventor: Yun Wang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 608 days.

(21) Appl. No.: 13/220,695

(22) Filed: Aug. 30, 2011

(65) Prior Publication Data

US 2012/0261074 A1  Oct. 18, 2012

(30) Foreign Application Priority Data

Apr. 12, 2011  (CN) .......................... 2011 1 0092117

(51) Int. Cl.
| | | |
|---|---|---|
| B05C 11/10 | (2006.01) | |
| B05C 17/06 | (2006.01) | |
| G02F 1/13 | (2006.01) | |
| G02F 1/1339 | (2006.01) | |
| G02F 1/1341 | (2006.01) | |

(52) U.S. Cl.
CPC ............ *G02F 1/1303* (2013.01); *G02F 1/1339* (2013.01); *G02F 2001/13415* (2013.01)
USPC ........... 156/356; 156/357; 118/301; 118/313; 118/504; 118/505; 118/712

(58) Field of Classification Search
CPC ...... B05B 12/00; B05B 12/004; B05B 15/04; B05B 15/045; B05B 7/06; B05C 11/00; B05C 11/10; B05C 17/06; B05C 21/005

USPC ......... 118/356, 313, 504, 505, 710, 712, 301; 156/356, 357

See application file for complete search history.

(56) References Cited

U.S. PATENT DOCUMENTS

| | | | |
|---|---|---|---|
| 6,192,956 B1 * | 2/2001 | Wensel | 156/357 |
| 2005/0115499 A1 * | 6/2005 | Lee et al. | 118/642 |
| 2009/0213317 A1 * | 8/2009 | Jian et al. | 349/163 |

FOREIGN PATENT DOCUMENTS

| | | |
|---|---|---|
| CN | 101226296 A | 7/2008 |
| CN | 201429756 Y | 3/2010 |
| CN | 101770119 A | 7/2010 |
| JP | 2003075796 A | 3/2003 |

* cited by examiner

*Primary Examiner* — George Koch
(74) *Attorney, Agent, or Firm* — Mark M. Friedman

(57) ABSTRACT

The present invention provides a liquid crystal sealant forming device and a display panel assembly apparatus using the same. The display panel assembly apparatus comprises the liquid crystal sealant forming device, an alignment assembly device, a transporting device and a curing device. The liquid crystal sealant forming device comprises a forming substrate; a plurality of liquid crystal dispensing openings formed on one side of the forming substrate for dispensing a liquid crystal on a substrate; and at least one sealant coating opening disposed around the liquid crystal dispensing openings for coating a sealant on the substrate. The present invention can form the liquid crystal and the sealant in the same apparatus.

9 Claims, 6 Drawing Sheets

LIQUID CRYSTAL SEALANT FORMING DEVICE AND DISPLAY PANEL ASSEMBLY APPARATUS USING THE SAME

FIELD OF THE INVENTION

The present invention relates to a field of a liquid crystal display technology, and more particularly to a liquid crystal sealant forming device and a display panel assembly apparatus using the same.

BACKGROUND OF THE INVENTION

Liquid crystal displays (LCDs) have been widely applied in electrical products. Currently, most of LCDs are backlight type LCDs which comprise a liquid crystal panel and a backlight module.

The liquid crystal panel is composed of two transparent substrates and a liquid crystal sealed there-between. In an assembly process of the liquid crystal panel, the liquid crystal is filled and sealed between the transparent substrates. Currently, the methods for filling the liquid crystal between the transparent substrates may be a vacuum siphon method and a one-drop filling (ODF) method. The filling time of the conventional vacuum siphon method is too long, and thus the ODF method is more suitable to a large-scale panel.

Taking the ODF method for example, in the ODF process, the liquid crystal is first dispensed on a glass substrate by a plurality of nozzles, and then another glass substrate can be aligned and assembled with the glass substrate with the dispensed liquid crystal, thereby forming a liquid crystal cell between the two glass substrates. The liquid crystal cell is sealed between the two glass substrates by a sealant, wherein the sealant is coated by nozzles of a sealant coating machine. Subsequently, the sealant between the two glass substrates is cured, thereby forming the liquid crystal display panel.

However, in general, different machines are required to coat the sealant and dispense the liquid crystal. Moreover, in a sealant coating process, due to stuffed nozzles or an abnormal pressure, a non-uniform width and a break of the sealant usually arise. Furthermore, in a liquid crystal dispensing process, due to air mixed into the liquid crystal, a leakage or an abnormal amount of liquid crystal drops usually arises.

As a result, it is necessary to provide a liquid crystal sealant forming device and a display panel assembly apparatus using the same to solve the problems existing in the conventional technologies, as described above.

SUMMARY OF THE INVENTION

The present invention provides a liquid crystal sealant forming device and a display panel assembly apparatus using the same to solve the problems in the process for forming the liquid crystal sealant.

A primary object of the present invention is to provide a liquid crystal sealant forming device for coating a liquid crystal and sealant on a substrate, wherein the liquid crystal sealant forming device comprises a forming substrate; a plurality of liquid crystal dispensing openings formed on one side of the forming substrate for dispensing a liquid crystal on a substrate; and at least one sealant coating opening being annular and formed on the forming substrate around the liquid crystal dispensing openings for receiving a sealant and coating the sealant on the substrate.

Another object of the present invention is to provide a display panel assembly apparatus for assembling a display panel, wherein the display panel comprises a first substrate and a second first substrate, and the display panel assembly apparatus comprises a liquid crystal sealant forming device comprising a forming substrate; a plurality of liquid crystal dispensing openings formed on one side of the forming substrate for dispensing a liquid crystal on the first substrate; and at least one sealant coating opening being annular and formed on the forming substrate around the liquid crystal dispensing openings for receiving a sealant and coating the sealant on the first substrate; an alignment assembly device configured to align and assemble the second substrate on the first substrate for forming the display panel; a transporting device configured to transport the display panel from the alignment assembly device; and a curing device configured to cure the sealant of the display panel transported by the transporting device.

In one embodiment of the present invention, the liquid crystal sealant forming device further comprises at least one alignment sensor disposed on the forming substrate for detecting whether the forming substrate is aligned above the substrate.

In one embodiment of the present invention, the liquid crystal dispensing openings are spaced at intervals, and there is a predetermined interval between each two of the liquid crystal dispensing openings.

In one embodiment of the present invention, the sealant coating opening is connected to a sealant tank, and the sealant coating opening include an electromagnetic valve to control the amount of the sealant in the sealant coating opening.

In one embodiment of the present invention, the sealant coating opening is connected to a pneumatic device for coating the sealant, which is filled in the sealant coating opening, on the substrate under a gas pressure.

In one embodiment of the present invention, the quantity of the at least one sealant coating opening is two, and the sealant coating openings are arranged around the liquid crystal dispensing openings as a pattern of concentric circles.

In one embodiment of the present invention, the liquid crystal sealant forming device further comprises a plurality of measuring cylinders disposed on the forming substrate, wherein one end of each of the measuring cylinders is connected to a liquid crystal tank for receiving the liquid crystal from the liquid crystal tank, and another end of each of the measuring cylinders is connected to one of the liquid crystal dispensing openings, and the liquid crystal received in the measuring cylinder is dispensed on the substrate through the liquid crystal dispensing openings.

In one embodiment of the present invention, the measuring cylinders include liquid crystal amount controllers for detecting the amount of the liquid crystal received in the measuring cylinders, and the liquid crystal amount controllers include electromagnetic valves for control the amount of the liquid crystal from the liquid crystal tank to the measuring cylinders.

In one embodiment of the present invention, the measuring cylinders are connected to a pneumatic device for dispensing the liquid crystal on the substrate under a gas pressure.

In comparison with the problems in the conventional liquid crystal dispensing and sealant coating machines, the liquid crystal sealant forming device and the display panel assembly apparatus using the same of the present invention can improve the air bubble problem of the liquid crystal and the non-uniform sealant problem, and significantly reduce the time of forming the liquid crystal and sealant. Furthermore, the display panel assembly apparatus can form the liquid crystal and sealant in the same device, thus reducing the equipment cost.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
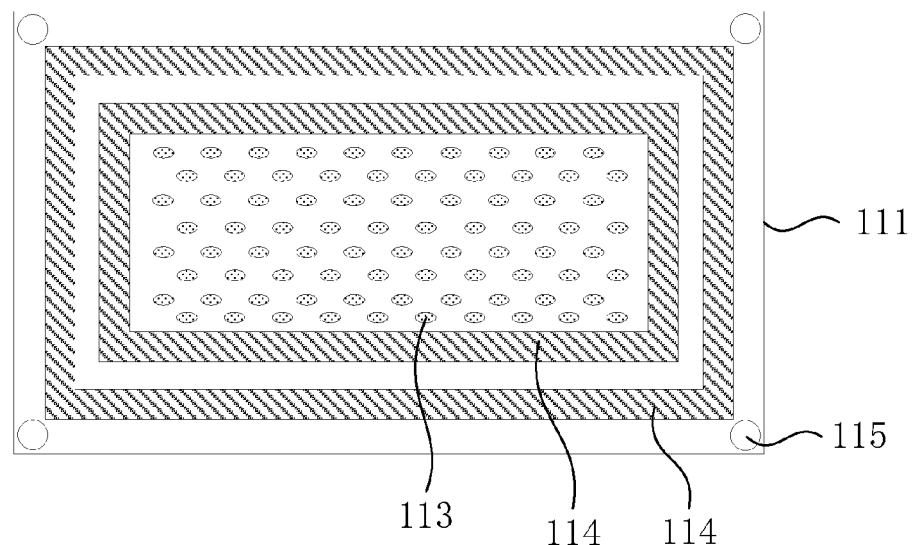
FIG. 1 is a schematic diagram showing a liquid crystal sealant forming device according to a first embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Figure 2:
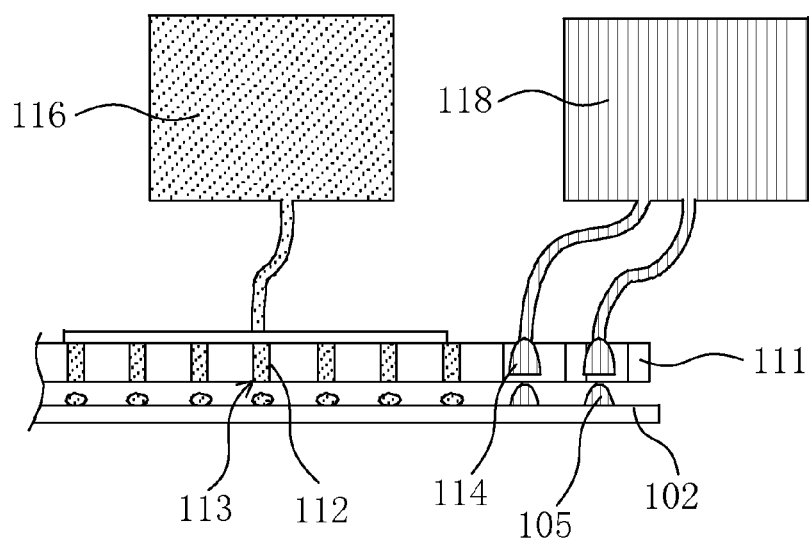
FIG. 2 is a partially cross-sectional view showing the liquid crystal sealant forming device according to the first embodiment of the present invention.

Referring to FIG. 1 and FIG. 2, FIG. 1 is a schematic diagram showing a liquid crystal sealant forming device according to a first embodiment of the present invention, and FIG. 2 is a partially cross-sectional view showing the liquid crystal sealant forming device according to the first embodiment of the present invention. The liquid crystal sealant forming device 110 of the present embodiment can dispense a liquid crystal and coat a sealant 105 on a first substrate 102. The liquid crystal sealant forming device 110 comprises a forming substrate 111, a plurality of measuring cylinders 112, a plurality of liquid crystal dispensing openings 113, at least one sealant coating opening 114, at least one alignment sensor 115 and a liquid crystal tank 116.

Figure 3:
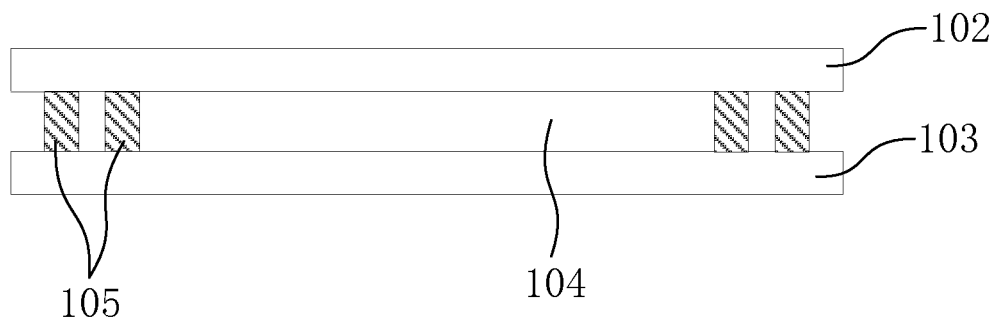
FIG. 3 is a cross-sectional view showing a display panel fabricated by the liquid crystal sealant forming device of FIG. 1.
Figure 4:
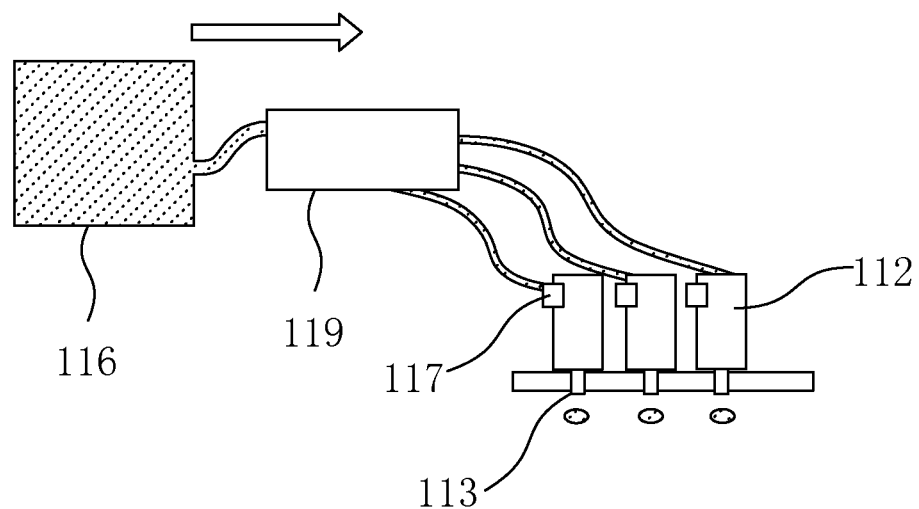
FIG. 4 is a schematic diagram showing the measuring cylinders, the liquid crystal dispensing openings and the liquid crystal tank according to the first embodiment of the present invention.

Referring to FIG. 3, a cross-sectional view showing a display panel fabricated by the liquid crystal sealant forming device of FIG. 1 is illustrated. The liquid crystal display panel 101 may comprise the first substrate 102, a second substrate 103, a liquid crystal layer 104 and the sealant 105. The liquid crystal layer 104 and the sealant 105 are formed between the first substrate 102 and the second substrate 103. The sealant 105 can enclose and seal the liquid crystal layer 104 to form a liquid crystal cell. In FIG. 2 and FIG. 3 of this embodiment, two sealants 105 between the first substrate 102 and the second substrate 103 are illustrated in FIG. 2 and FIG. 3. However, one or more sealants 105 may also be disposed between the first substrate 102 and the second substrate 103. The first substrate 102 and the second substrate 103 may be glass substrates or flexible plastic substrates. In this embodiment, the first substrate 102 may be a glass substrate or other material substrate with color filters (CF), and the second substrate 103 may be a glass substrate or other material substrate with a thin film transistor (TFT) array. The sealant 105 is formed as a frame-shaped structure to enclose the liquid crystal layer 104. The sealant 105 may be a light-curing sealant or a heat-curing sealant. The light-curing sealant may be, for example, a UV Curable adhesive or a visible light curing glue.

Figure 5:
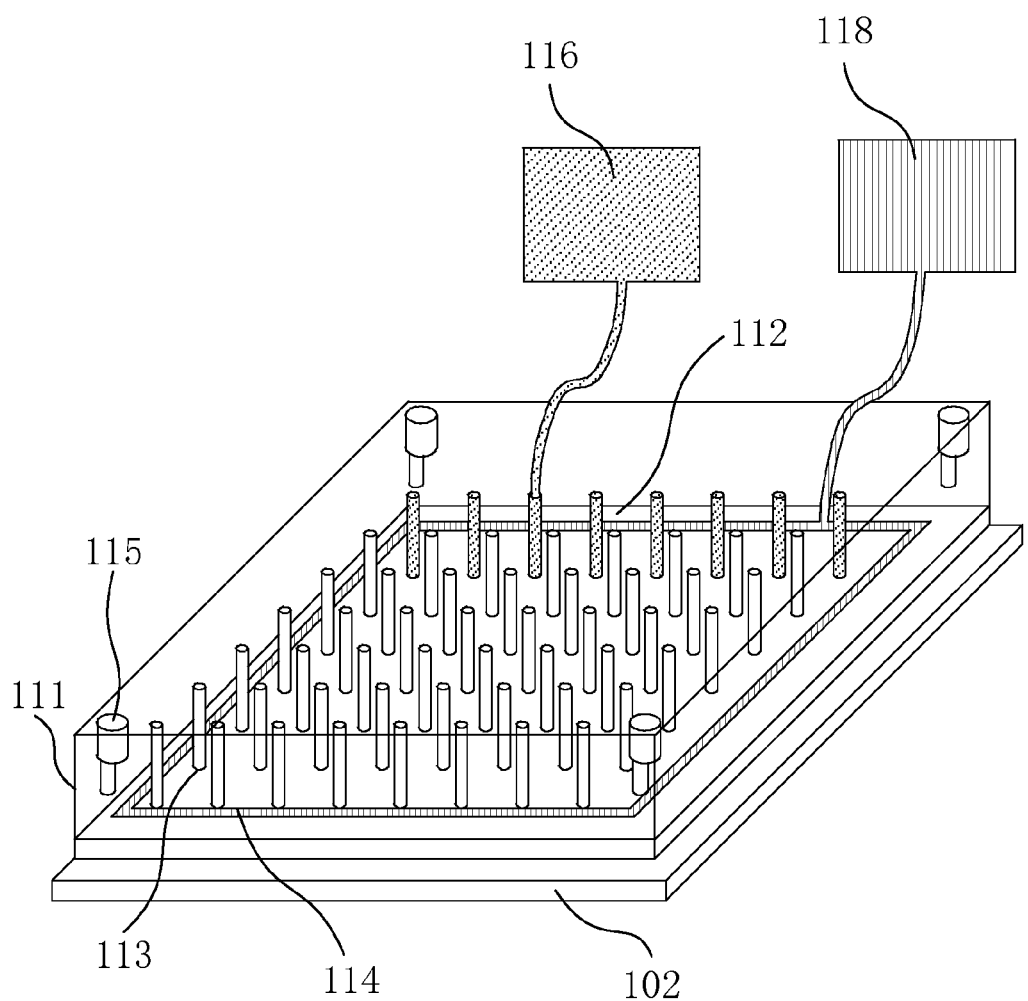
FIG. 5 is a perspective view showing the liquid crystal sealant forming device according to the first embodiment of the present invention.

Referring to FIG. 1, FIG. 2, FIG. 4 and FIG. 5, FIG. 4 is a schematic diagram showing the measuring cylinders, the liquid crystal dispensing openings and the liquid crystal tank according to the first embodiment of the present invention, and FIG. 5 is a perspective view showing the liquid crystal sealant forming device according to the first embodiment of the present invention. The forming substrate 111 is preferably a plate-like structure, and the area of the forming substrate is at least larger than an area enclosed by the sealant 105. The forming substrate 111 is preferably made of a transparent material, such as glass, thereby facilitating the alignment between the forming substrate 111 and the first substrate 102. The measuring cylinders 112 are connected between the liquid crystal dispensing openings 113 and the liquid crystal tank 116 for receiving the liquid crystal. The measuring cylinders 112 include liquid crystal amount controllers 117 which are disposed at the inlets thereof for detecting the amount of the liquid crystal received in the measuring cylinders 112 and controlling the switches thereof by using electromagnetic valves, so as to control the amount of the liquid crystal in the measuring cylinders 112. The liquid crystal dispensing openings 113 are spaced at intervals and arranged on one side of the forming substrate 111. Furthermore, the liquid crystal dispensing openings 113 are connected to the liquid crystal tank 116 for dispensing the liquid crystal on the first substrate 102. There is a predetermined interval between each two of the liquid crystal dispensing openings 113 for controlling the thickness and quality of the liquid crystal layer 104. The sealant coating opening 114 is annular and formed on the forming substrate 111, and the sealant coating opening is connected to a sealant tank 118 for receiving the sealant 105 and coating it on the first substrate 102, wherein the line width and height of the coated sealant 105 can be adjusted by adjusting the opening width and height of the sealant coating opening 114. Moreover, the injection of the sealant is switched by an electromagnetic valve (not shown) between the sealant coating opening 114 and the sealant tank 118. The electromagnetic valve is used to control the amount of the sealant. The alignment sensor 115 is, for example, an image detection device, such as a charge-coupled device (CCD) or a complementary metal oxide semiconductor (CMOS), disposed at the corner or edge of the forming substrate 111 for detecting the forming substrate 111 is precisely aligned above the first substrate 102.

In this embodiment, the quantity of the at least one sealant coating opening 114 is two, and the sealant coating openings 114 are arranged around the liquid crystal dispensing openings 113 as a pattern of concentric circles. The shapes of the two sealant coating openings 114 are similar to concentric rectangles for forming a main seal and a dummy seal. In another embodiment, the quantity of the at least one sealant coating opening 114 is one for coating one sealant 105.

In other embodiments, the liquid crystal sealant forming device 110 may further comprise other detectors (not shown), such as a liquid crystal filling detector, a leakage detector or a sealant filling detector, for detecting the filling of the liquid crystal in the liquid crystal dispensing openings 113, the leakage of the liquid crystal or the filling of the sealant in the sealant coating opening 114, thus enhancing the forming quality of the liquid crystal layer 104 and the sealant 105.

When forming the liquid crystal layer 104 and the sealant 105 on the first substrate 102 with use of the liquid crystal sealant forming device 110, the forming substrate 111 is moved to the top of the first substrate 102 by a driving device and spaced at an appropriate height (such as 5 mm). Subsequently, the forming substrate 111 can be aligned above the first substrate 102 by the alignment sensor 115. Subsequently, when preparing to dispense the liquid crystal and coat the sealant, the forming substrate 111 is lowered to a predetermined height for dispensing the liquid crystal and coating the sealant. At this time, the interval between the forming substrate 111 and the first substrate 102 is preferably 0.5~2 mm. Subsequently, the liquid crystal sealant forming device 110 can dispense the liquid crystal and coat the sealant on the first substrate 102 at the same time or sequentially.

When dispensing the liquid crystal and coating the sealant on the first substrate 102 with use of the liquid crystal sealant forming device 110, the liquid crystal in the liquid crystal tank 116 is first pumped to the measuring cylinders 112 by a pump 119, and the sealant in the sealant tank 116 is also filled into the sealant coating opening 114. Subsequently, the liquid crystal in the measuring cylinders 112 can be dispensed on the first substrate 102 through the liquid crystal dispensing openings 113 under a gas (such as nitrogen) pressure of a pneumatic device (not shown), so as to form the liquid crystal layer 104 on the first substrate 102. Moreover, the sealant in the sealant coating opening 114 can also be coated on the first substrate 102 under a gas (such as nitrogen) pressure of another pneumatic device (not shown), so as to form the sealant 105 on the first substrate 102.

Figure 6:
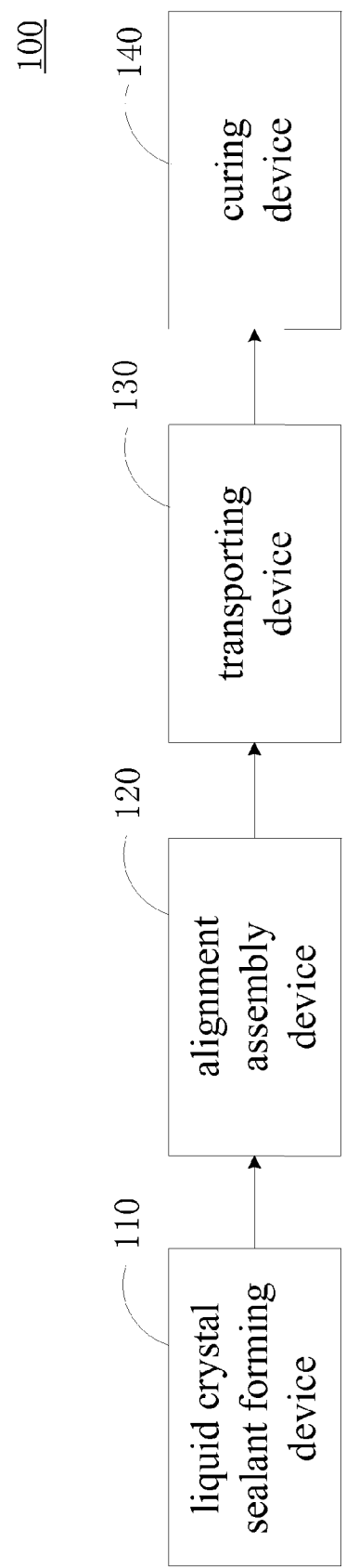
FIG. 6, a schematic diagram showing a display panel assembly apparatus according to the present invention.

Referring to FIG. 6, a schematic diagram showing a display panel assembly apparatus according to the present invention is illustrated. The display panel assembly apparatus 100 of the present embodiment is configured to fabricate the display panel 101. The display panel assembly apparatus 100 may comprise the liquid crystal sealant forming device 110, an alignment assembly device 120, a transporting device 130 and a curing device 140. The alignment assembly device 120 may be disposed downstream of the liquid crystal filling device 110 for aligning and assembling the second substrate 103 on the first substrate 102 to form the display pane 101. Referring to FIG. 3 again, the alignment assembly device 120 preferably aligns and assembles the first substrate 102 and the second substrate 103 in a vacuum environment to reduce defects, such as bubbles. For example, the alignment assembly device 120 may be positioned in a vacuum box to align and assemble the first substrate 102 and second substrate 103. The transporting device 130 may be disposed between the alignment assembly device 120 and the curing device 140 configured to transport the display panel 101 from the alignment assembly device 120 to the curing device 140. In this case, the transporting device 130 can transport the display panel 101 by using robot arms, roller elements or other means. The curing device 140 is disposed downstream of the transporting device 130 configured to completely cure the sealant 105. In this embodiment, the curing device 140 can cure the sealant 105 between the first substrate 102 and second substrate 103 by using a light curing method or a hot curing method. In the light curing method, a visible light (wavelength about 380 nm~780 nm) or an invisible light (such as UV light or infrared light) can be used to cure the sealant 105. At this time, the curing device 140 may be a lighting machine which emits light to the sealant 105 for light curing. Furthermore, the curing device 140 can cure the sealant 105 by using the heat curing method, such as a hot pressure method.

Since a conventional liquid crystal dispensing machine uses nozzles to continuously dispense the liquid crystal, air bubbles tend to be mixed into the liquid crystal. Therefore, in comparison with the conventional liquid crystal dispensing machine, by using the liquid crystal dispensing openings 113 of the liquid crystal sealant forming device 110, only one liquid crystal dispensing step is required to dispense a large number of liquid crystal drops for forming the liquid crystal layer 104 of the panel. Accordingly, the problem of air bubbles mixed in the liquid crystal can be alleviated, and the time of the liquid crystal dispensing time can be significantly reduced. Furthermore, the sealant 105 is coated on the first substrate 102 by the ring-like sealant coating opening 114 around the liquid crystal dispensing openings 113, and thus the whole sealant 105 can be formed in one coating step for improving the non-uniform width and break of the sealant and reducing the time of the sealant coating process. Moreover, the liquid crystal and the sealant can be formed on the first substrate 102 at the same time by the liquid crystal sealant forming device 110, thereby reducing the transportation of the substrate.

Figure 7:
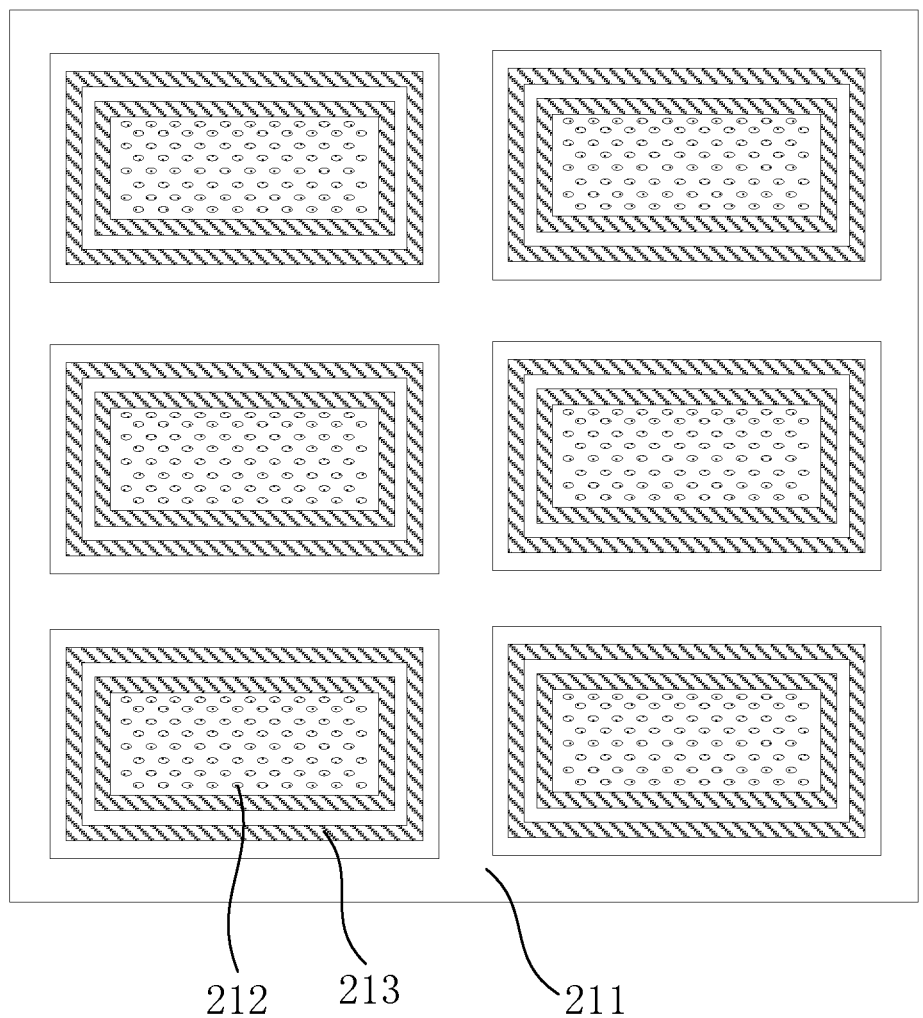
FIG. 7 is a schematic diagram showing a liquid crystal sealant forming device according to a second embodiment of the present invention.
Figure 8:
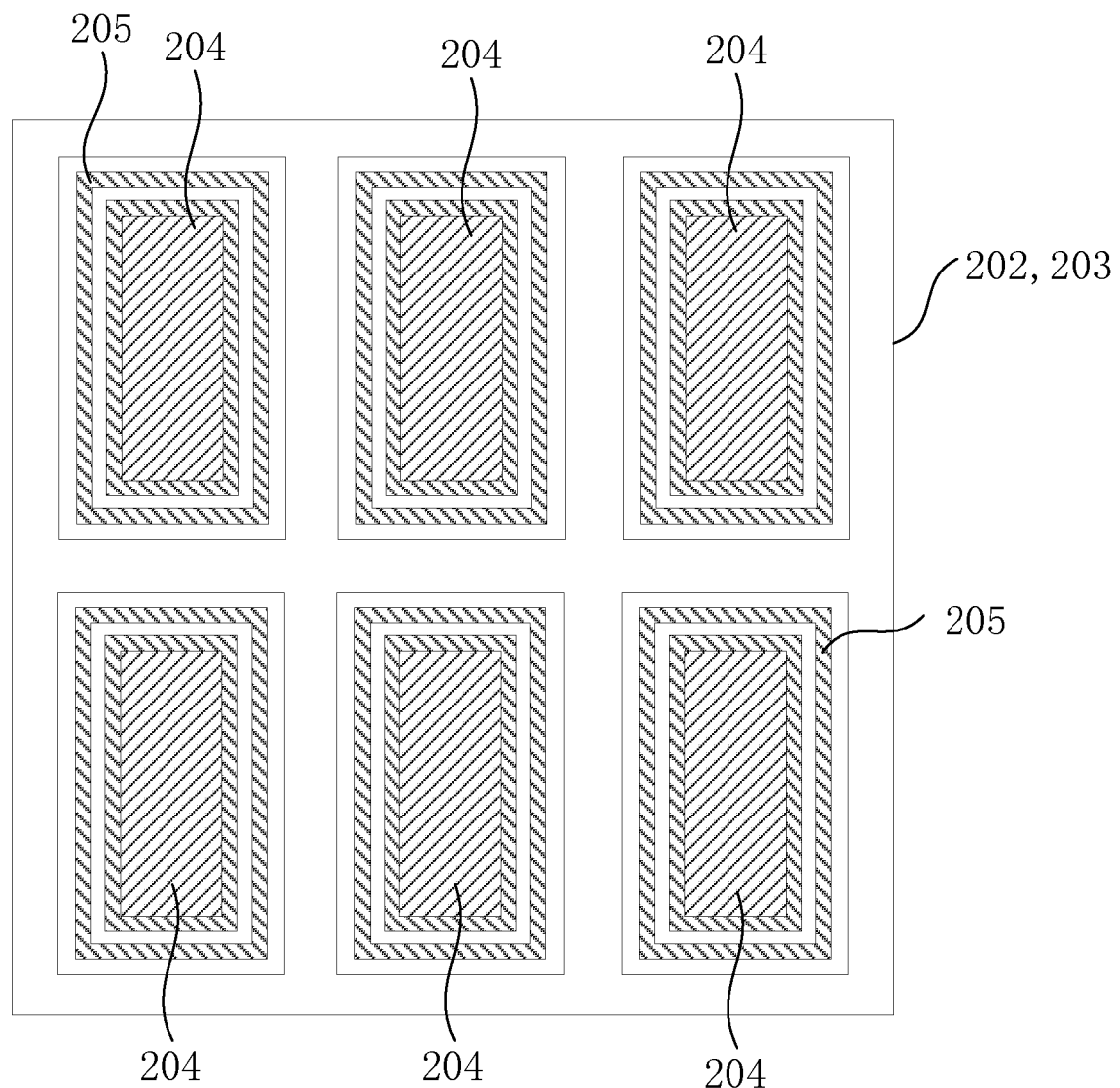
FIG. 8 is a schematic diagram showing a display panel fabricated by the liquid crystal sealant forming device of FIG. 7.

Referring to FIG. 7 and FIG. 8, FIG. 7 is a schematic diagram showing a liquid crystal sealant forming device according to a second embodiment of the present invention, and FIG. 8 is a schematic diagram showing a display panel fabricated by the liquid crystal sealant forming device of FIG. 7. Only the difference between the embodiment and the first embodiment will be described hereinafter, and thus the similar portions there-between will be not stated in detail herein. In comparison with the first embodiment, the liquid crystal sealant forming device 220 of the second embodiment comprises a plurality of sealant coating openings 213 which are arranged in a matrix manner on the forming substrate 211. A plurality of liquid crystal dispensing openings 212 are arranged within each of the ring-like sealant coating openings 213. When forming a liquid crystal layer 204 and sealants 205 on the first substrate 202 with use of the liquid crystal sealant forming device 210, the sealants 205 are formed on the first substrate 202 by the sealant coating openings 213, and the liquid crystal is dispensed within the sealants 205 by the liquid crystal dispensing openings 212. At this time, a plurality of panel units are arranged between the first substrate 202 and the second substrate 203 and spaced at intervals. The sealants 205 are formed around the panel units, respectively. In the second embodiment, the first substrate 202 and the second substrate 203 can be cut into a plurality of liquid crystal display panels. Therefore, with use of the liquid crystal sealant forming device 210, the forming time of the liquid crystal and the sealant can be significantly reduced to raise the production efficiency.

As described above, the liquid crystal sealant forming device and the display panel assembly apparatus using the same of the present invention can significantly improve the air bubble problem of the liquid crystal and the quality of the sealant. The liquid crystal sealant forming device can rapidly form the liquid crystal and the sealant, thereby reducing the process time and the time for panel transportation. Moreover, the liquid crystal sealant forming device of the present invention can form the liquid crystal and the sealant on the substrate at the same time without using two different machines, thus reducing the equipment cost.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A liquid crystal sealant forming device for coating a liquid crystal and sealant on a substrate, wherein the liquid crystal sealant forming device comprises:
   a forming substrate;
   a plurality of liquid crystal dispensing openings formed on one side of the forming substrate for dispensing the liquid crystal on the substrate;
   at least one sealant coating opening being annular and formed on the forming substrate around the liquid crystal dispensing openings for receiving the sealant and coating the sealant on the substrate;
   at least one alignment sensor disposed on the forming substrate for detecting whether the forming substrate is aligned above the substrate; and
   a plurality of measuring cylinders disposed on the forming substrate, wherein one end of each of the measuring cylinders is connected to a liquid crystal tank for receiving the liquid crystal from the liquid crystal tank, and another end of each of the measuring cylinders is connected to one of the liquid crystal dispensing openings, and the liquid crystal received in the measuring cylinder is dispensed on the substrate through the liquid crystal dispensing openings.

2. A liquid crystal sealant forming device comprising:
   a forming substrate;
   a plurality of liquid crystal dispensing openings formed on one side of the forming substrate for dispensing a liquid crystal on a substrate;
   at least one sealant coating opening being annular and formed on the forming substrate around the liquid crystal dispensing openings for receiving a sealant and coating the sealant on the substrate; and
   a plurality of measuring cylinders disposed on the forming substrate, wherein one end of each of the measuring cylinders is connected to a liquid crystal tank for receiving the liquid crystal from the liquid crystal tank, and another end of each of the measuring cylinders is connected to one of the liquid crystal dispensing openings, and the liquid crystal received in the measuring cylinder is dispensed on the substrate through the liquid crystal dispensing openings.

3. The liquid crystal sealant forming device according to claim 2, further comprising at least one alignment sensor disposed on the forming substrate for detecting whether the forming substrate is aligned above the substrate.

4. The liquid crystal sealant forming device according to claim 2, wherein the liquid crystal dispensing openings are spaced at intervals, and there is a predetermined interval between each two of the liquid crystal dispensing openings.

5. The liquid crystal sealant forming device according to claim 2, wherein the sealant coating opening is connected to a sealant tank, and the sealant coating opening include an electromagnetic valve to control the amount of the sealant in the sealant coating opening.

6. The liquid crystal sealant forming device according to claim 2, wherein the sealant coating opening is connected to a pneumatic device for coating the sealant, which is filled in the sealant coating opening, on the substrate under a gas pressure.

7. The liquid crystal sealant forming device according to claim 2, wherein the quantity of the at least one sealant coating opening is two, and the sealant coating openings are arranged around the liquid crystal dispensing openings as a pattern of concentric circles.

8. The liquid crystal sealant forming device according to claim 2, wherein the measuring cylinders include liquid crystal amount controllers for detecting the amount of the liquid crystal received in the measuring cylinders, and the liquid crystal amount controllers include electromagnetic valves for control the amount of the liquid crystal from the liquid crystal tank to the measuring cylinders.

9. The liquid crystal sealant forming device according to claim 2, wherein the measuring cylinders are connected to a pneumatic device for dispensing the liquid crystal on the substrate under a gas pressure.

* * * * *